United States Patent
Besharat et al.

(10) Patent No.: US 6,219,540 B1
(45) Date of Patent: Apr. 17, 2001

(54) COMMUNICATION DEVICE PROVIDING OUT-OF-RANGE BATTERY SAVING AND METHOD THEREFOR

(75) Inventors: Mark Besharat, Kensignton; Jochen G. Winzer, Handen; Edward Daly, Briston; Ron Lizzi, W. Hartford, all of CT (US); Len Bennett, Plantation, FL (US)

(73) Assignees: Motorola, Inc., Schaumburg, IL (US); Timex Corporation, Middlebury, CT (US)

( * ) Notice: Subject to any disclaimer, the term of this patent is extended or adjusted under 35 U.S.C. 154(b) by 0 days.

(21) Appl. No.: 09/197,989

(22) Filed: Nov. 23, 1998

(51) Int. Cl.⁷ .................................................. H04Q 7/32
(52) U.S. Cl. .................. 455/421; 455/226.1; 455/226.4; 455/38.1; 455/229; 340/840.49
(58) Field of Search .................................. 455/421, 38.3, 455/343, 574, 226.1, 229, 226.2, 226.3, 226.4, 231, 242.2, 277.2, 344, 67.1, 422, 432, 436, 67.7, 54.1, 62, 52, 53, 462, 465, 502, 817; 340/825.44, 825.21, 825.47, 825.48, 825.49, 825.36

(56) References Cited

U.S. PATENT DOCUMENTS

| | | |
|---|---|---|
| 4,652,875 | 3/1987 | Waki . |
| 4,745,408 | 5/1988 | Nagata et al. . |
| 5,193,216 * | 3/1993 | Davis .................................... 455/67.7 |
| 5,203,013 * | 4/1993 | Breeden et al. ..................... 455/54.1 |
| 5,373,548 * | 12/1994 | McCarthy .............................. 379/63 |
| 5,450,613 * | 9/1995 | Takahara et al. .................... 455/54.1 |
| 5,490,286 * | 2/1996 | Kah, Jr. ................................ 455/51.1 |
| 5,644,620 * | 7/1997 | Shimura ................................ 455/421 |
| 5,809,414 * | 9/1998 | Coverdale et al. .................. 455/421 |
| 5,867,782 * | 2/1999 | Yoon .................................... 455/421 |
| 5,953,677 * | 9/1999 | Sato ..................................... 455/574 |
| 5,966,656 * | 10/1999 | Elkin et al. ........................... 455/421 |
| 5,977,881 * | 11/1999 | Kido ................................. 340/825.44 |
| 6,081,725 * | 6/2000 | Ishida .................................. 455/462 |

OTHER PUBLICATIONS

Beepwear User's Guide, a Timex and Motorola product, 1997 MTX Paging Products, LLC.
A Standard Code for Radiopaging, British Post Office, 1978 and 1979 First reprint, Telecommunications Development Department pp. 1–40.

* cited by examiner

Primary Examiner—Daniel Hunter
Assistant Examiner—Pablo Tran
(74) Attorney, Agent, or Firm—Philip P. Macnak (57) ABSTRACT

A communication device (100) provides an out-of-range battery saving function (700) for a receiver (104) which receives messages transmitted from at least one transmitter (902) over a radio frequency channel. The communication device (100) includes a signal quality detector (154) which detects when the communication device (100) is out-of-range of the transmitter 902, and a controller (108) which determines when the communication device (100) is out-of-range for a first predetermined period of time (726), generating an out-of-range confirmation signal (728). A first visual warning (214, 216, 222) is displayed on a display (128) and power to the receiver (104) is subsequently suspended by a power control circuit (154). Alternately, when out-of-range for a second predetermined period of time (722) less than the first period of time 726, an out-of-range notification signal (724) is generated. The display (128) displays a second visual warning (210) while the power control circuit (154) maintains a supply of power to the receiver (104) to enable in-range detection of the transmitter 902.

19 Claims, 7 Drawing Sheets

COMMUNICATION DEVICE PROVIDING OUT-OF-RANGE BATTERY SAVING AND METHOD THEREFOR

BACKGROUND OF THE INVENTION

1. Field of the Invention

The present invention relates generally to battery powered communication devices, and more particularly to a battery powered communication device which provides out-of-range battery saving.

2. Description of the Related Art

Communication devices which are operated from a battery have generally had limited operational lifetime, due largely to high receiver operating currents. Battery saving techniques have been developed, and have been widely used which significantly extend the operating lifetime of the communication device.

One of the most widely known battery saving techniques used by paging receivers can be found in the POCSAG (Post Office Code Standardization Advisory Group) paging format, in which the paging receiver has two modes of operation. The first mode is a modulation detection, or asynchronous, battery saving mode facilitated by the provision of a preamble of bit reversals. Good battery economy is provided in low transmission periods using short signal sampling periods.

The second mode is a time division, or synchronous, battery saving mode facilitated by the use of eight frames per batch. Good battery economy is provided by switching off the receiver during those frames in which the pager has no interest.

Other techniques for battery saving have been developed which utilize information located typically in the synchronization code word to extend the interval of time between the signal sampling periods, or through the use of an additional code word which defines a time interval during which the paging receiver will battery save. Because battery savings decisions are influenced by the relative signal strength at the receiver, signal quality measurements have also been used to improve the battery save decision making process, and have reverted to conventional asynchronous battery saving techniques when the signal quality is weak.

Communication devices, such as paging receivers described above, have used various techniques to improve battery life during periods of time when there is normal message traffic on the channel, when there is low message traffic on the channel, and when signal conditions on the channel are weak. Such communication devices have also reverted to conventional battery saving techniques when the communication device is out-of-range of a transmitter.

The use of conventional battery saving techniques can greatly impact battery life when a communication device is out-of-range of a transmitter. What is needed is a battery saving technique which can improve battery life when a communication device is out-of-range of a transmitter. What is also needed is a method by which a user of the communication device is notified that the communication device is out-of-range of a transmitter, and that the communication device is battery saving.

BRIEF DESCRIPTION OF THE DRAWINGS

The features of the invention which are believed to be novel are set forth with particularity in the appended claims. The invention itself may be best understood by reference to the following description when taken in conjunction with the accompanying drawings, in the several figures of which like reference numerals identify identical elements, in which, and wherein:

DETAILED DESCRIPTION OF THE INVENTION

Figure 1:
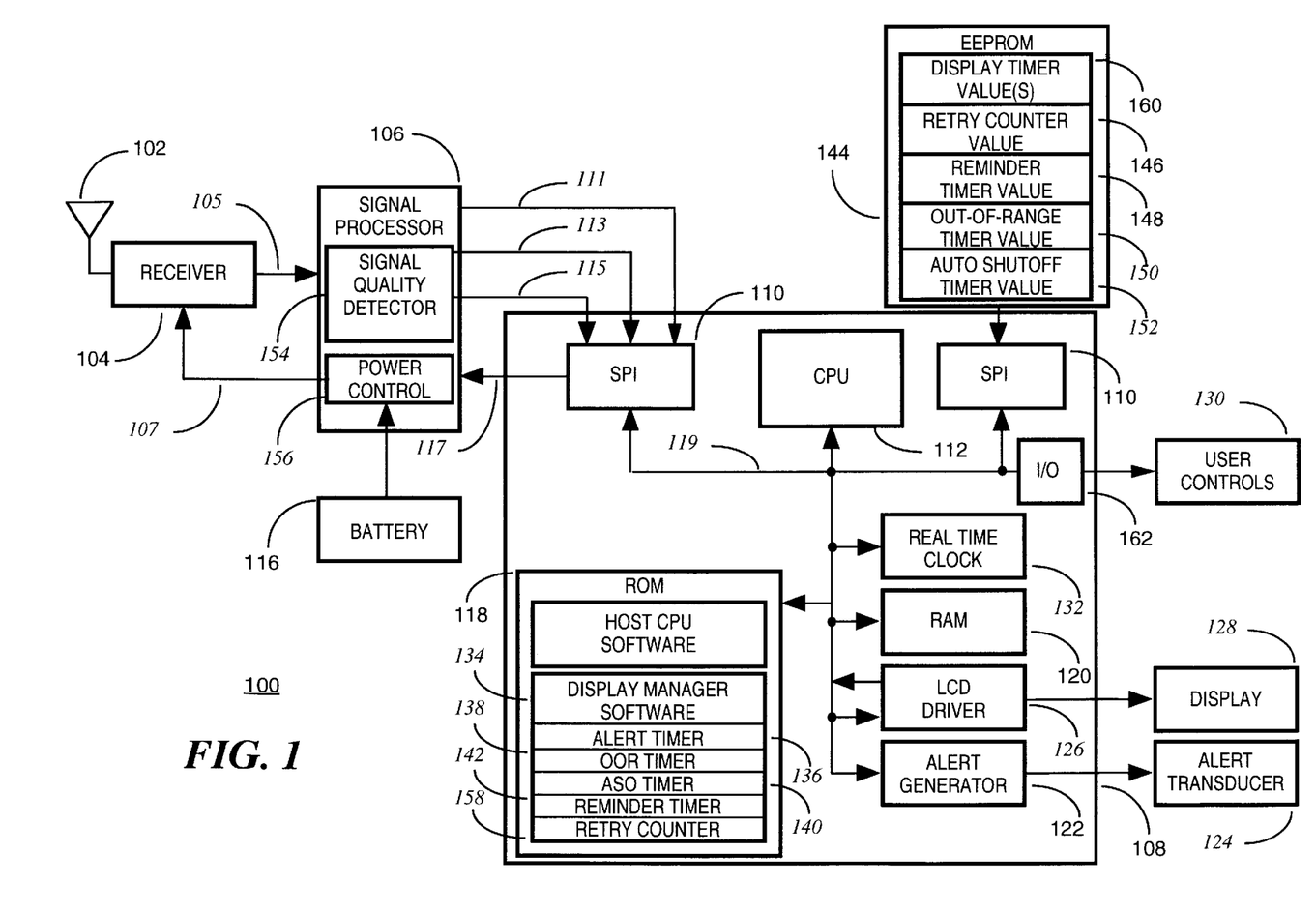
FIG. 1 is an electrical block diagram of a communication device providing out-of-range battery saving in accordance with the present invention.

FIG. 1 is an electrical block diagram of a communication device 100 providing an out-of-range battery saving in accordance with the present invention. The communication device 100 can be a paging receiver which is worn on the belt; or can also include a non-receiver related function, such as timekeeping function, and be worn on belt or the wrist. It will be appreciated that any communication device which operates from a limited energy content battery can benefit from the out-of-range battery saving function in accordance with the present invention.

Turning to FIG. 1, at least one transmitter 902 (shown in FIG. 9) transmits messages over a radio frequency channel 904. The transmitted messages are intercepted by an antenna 102. The transmitter 902 can be a single transmitter, or it will be appreciated, can be part of a multiple transmitter simulcast transmission system. A receiver 104 processes the messages intercepted by the antenna 102 in a manner well known in the art, providing at the receiver output a baseband message signal 105 which can be either analog or digital, representing message information recovered from the transmitted messages. The message information typically includes synchronization information, address information identifying the communication device 100 to which a message is directed, and the message. By way of example, the message can be an analog voice message, a digitized voice message, or numeric or alphanumeric data message. It will be appreciated that other message formats can be received as well. The baseband message signal 105 is coupled to a signal processor 106 which processes the message information in a manner well known in the art depending upon the format of the baseband message signal, and provides recovered message data 111 at the signal processor output. For purpose of description, it will be assumed that the recovered message data 111 represents a numeric or alphanumeric data message. When a numeric or alphanumeric data message is present, the signal processor output provides as the recovered message data 111 a stream of binary data which is then further processed by a controller 108.

The signal processor 106 also includes a signal quality detector 154 which preferably monitors the bit error rate (BER) of the message information to derive an out-of-range detection signal 113 which is utilized to restart an OOR timer 138 (out-of-range timer), and also derives an in-range detection signal 115 which is utilized to stop the OOR timer 138, as will be described below. Power 107 to the receiver 104 is controlled by a power control circuit 156 which is used to enable a supply of power 107 to the receiver 104 provided from a battery 116, and also used to disable the supply of power 107 to the receiver 104 under the control of the controller 108 using a power control information signal 117. Battery saving is accomplished within the communication device 100 using any of a number of well known signaling protocols which provide a battery saving function, such as the well known POCSAG (Post Office Code Standardization Advisory Group) signaling protocol or the well known FLEX™ signaling protocol. The recovered message data 111, the out-of-range detection signal 113, the in-range detection signal 115, and the power control information signal 117 are coupled to the controller 108 through a serial peripheral interface (SPI) 110.

The controller 108 includes a central processing unit (CPU) 112 which controls the operation of the communication device 100 through software routines stored in a ROM 118 (read only memory). The ROM 118 includes host CPU software routines which controls the basic operation of the communication device 100 in a manner well known by one of ordinary skill in the art, display manager software 134 which provides a display timer and controls the display of message information and time information on a display 128, alert timer 136 software which controls the time an alert signal is generated, OOR timer 138 (out-of-range timer) software which controls the time the communication device must be first out-of-range of a transmitter 902 before further battery saving activities occur, ASO timer 140 (automatic shutoff timer) software which controls the time the communication device 100 must be out of range of the transmitter 902 before receiver shutdown occurs, reminder timer 142 software which controls the time between reminders that the receiver is shut down, and retry counter 158 software which controls the number of times a reminder alert is generated, as will be described further below. A real time clock 132 generates time information which is displayed on the display 128, as will be described below.

When a message is received, the user of the communication device 100 is alerted to reception of the message using an alert generator 122 which generates an alert signal which is coupled to an alert transducer 124, in a manner well known to one of ordinary skill in the art. It will be appreciated that the alert transducer 124 can provide some form of sensible alert, such as an audible alert, a tactile alert, a visual alert, or any combination thereof, provided suitable transducers for each type of alert are provided, i.e. an electromagnetic or piezoelectric transducer or speaker for audible alerts, a vibrating transducer for tactile alerts, or a lamp, led, or electroluminescent panel for visual alerts. The received messages and the time information are displayed on the display 128 using preferably a liquid crystal display (LCD) driver 126, in a manner well known by one of ordinary skill in the art. The messages are stored in a RAM 120 (random access memory), which is also used to store variables and other information generated by the CPU 112. Messages which are stored in the RAM 120 can be recalled for display via user controls 130. A non-volatile memory, such as an EEPROM 144 (electrically erasable programmable read only memory) is coupled to the controller 108 through an I/O (input/output) port 162. Also coupled to the controller 108 through the SPI 110. The EEPROM 144 stores parameter information such as a retry counter value 146, a reminder timer value 148, an OOR timer value 150, an ASO timer value 152, one or more display timer values 160, and while not shown, predetermined address information which uniquely identifies the communication device 100 in a manner well known to one of ordinary skill in the art. The interaction of the software routines stored in the ROM 118, and the parameter information stored in the EEPROM 144 for providing out-of-range battery saving in accordance with the present information will be better understood with the description provided below.

Figure 2:
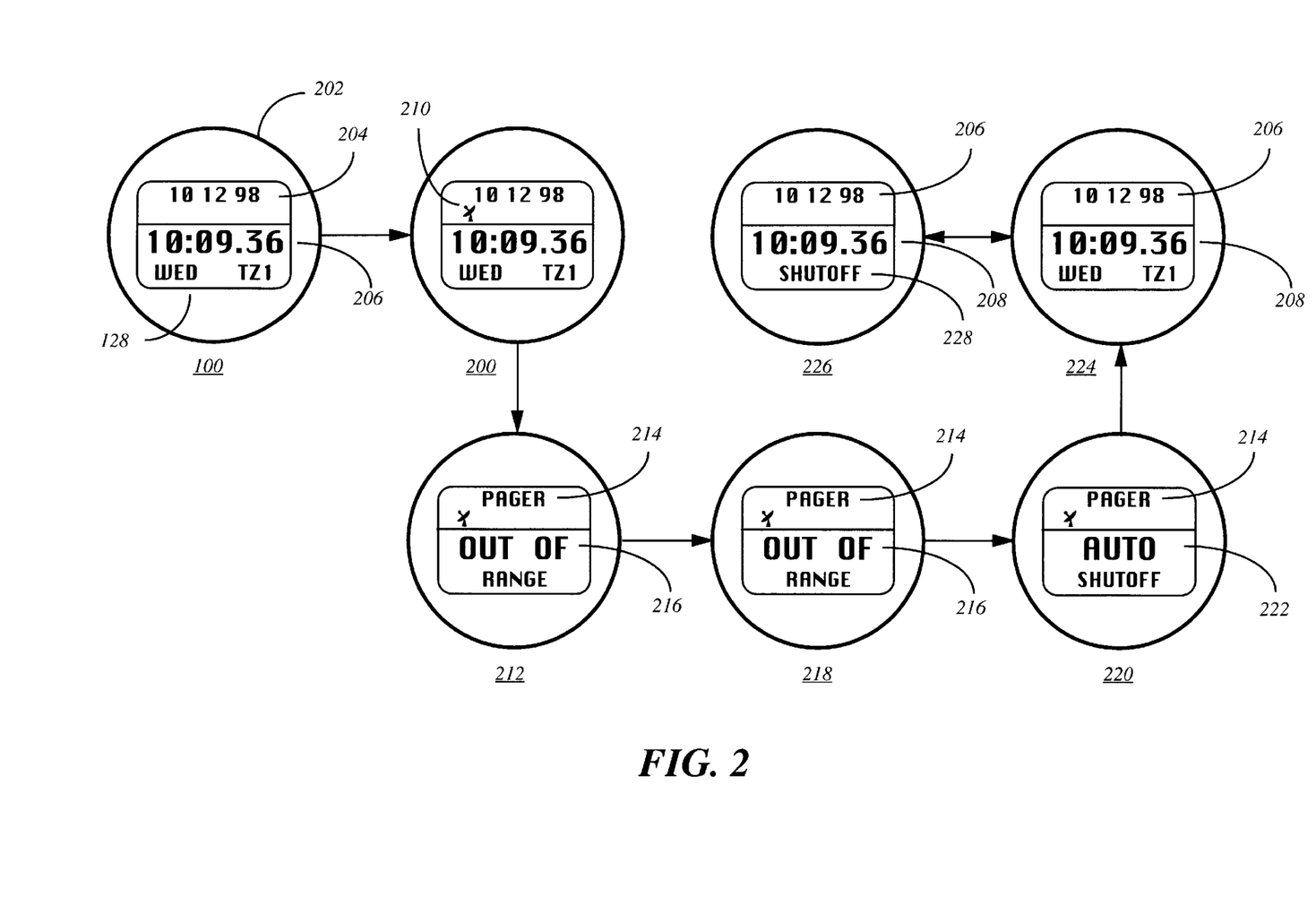
FIG. 2 is a diagram which illustrates a user notification procedure for the communication device providing out-of-range battery saving in accordance with the present invention.

FIG. 2 is a diagram which illustrates user notification and confirmation of an out-of-range condition for the communication device 100 providing out-of-range battery saving in accordance with the present invention. The communication device 100 is shown pictorially by way of example as a wrist worn receiving device, such as a wrist worn pager which includes such non-receiver related function as timekeeping. The electronics of the communication device 100 described above are enclosed in a housing 202 which also encloses the display 128. The user controls 130 are provided by conventional switches (not shown). By way of example, when the timekeeping functions are operational, date information 204 (such as "Oct. 12, 1998") is displayed on the display 128, together with time information 206 (such as "10:09.36") and other information, such as the day of the week (such as "WED") and time zone information (such as "TZ1") when the timekeeping functions have provision for displaying times for multiple time zones.

When an out-of-range condition is initially detected by the signal quality detector 154, the OOR timer 138 and the ASO timer 140 are started, as will be described below, and upon time-out of the OOR timer 138, an OOR icon 210 can be displayed, as shown in view 200. When the ASO timer 140 times out, as will be described below, the date information 204 and time information 206 are changed to first visual warning including such information as "PAGER" 214 "OUT OF RANGE" 216 is displayed indicating that the communication device 100 has been out of range for at least a first predetermined period of time, as shown in view 212. The user of the communication device is also sensibly alerted to the out-of-range condition. The information remains displayed for a second predetermined period of time, to be described below, as shown in view 218. Once the second predetermined period of time has elapsed, the user of the communication device 100 is provided a second visual warning including such information as "PAGER" 214 "AUTO SHUTOFF" 216 indicating the pager auto shutoff mode is being activated, as shown in view 220. Once the communication device 100 has been shut off, the display reverts to the timekeeping display, as shown in view 224. The user is preferably continuously reminded the communication device 100 is out-of-range by way of alternately the display of time, as shown in view 224 and a display indicating the receiver is shutoff, as shown in view 226. The out-of-range reminder as shown in view 226 is alternately displayed with the time as shown in view 224 until the communication device again comes within range of a transmitter 902, and the communication device is again turned on by the user, as will be described below.

Figure 3:
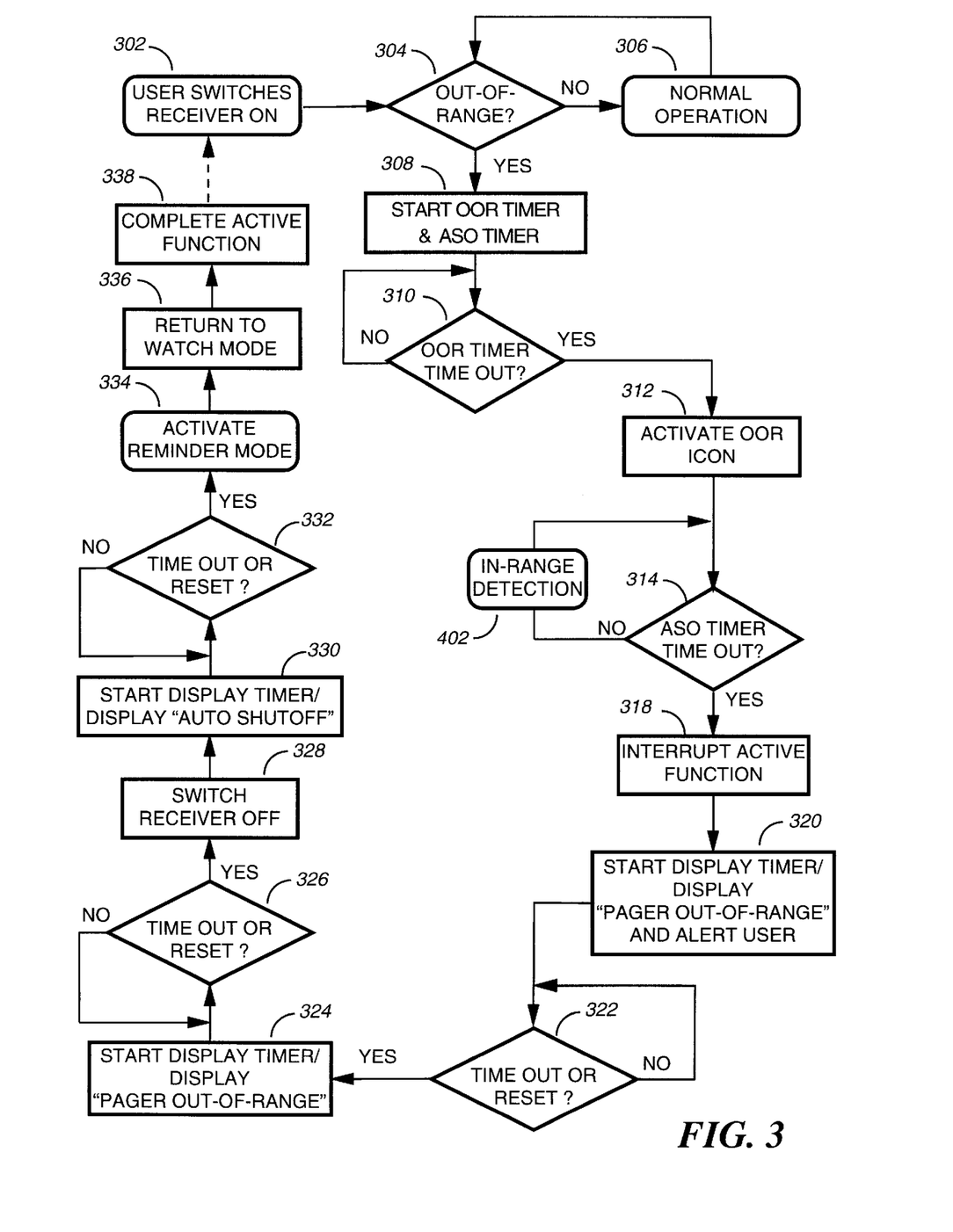
FIGS. 3 through 6 are flow charts which illustrate the user notification procedure for the communication device providing out-of-range battery saving in accordance with the present invention.
Figure 4:
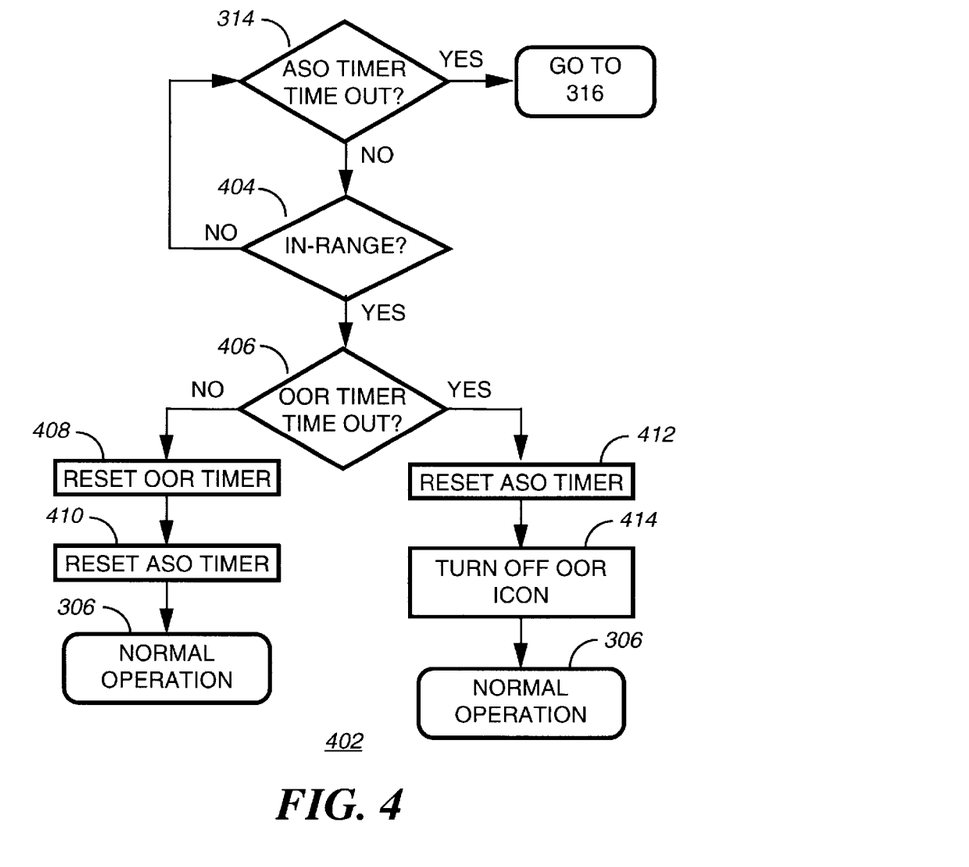

FIGS. 3 through 6 are flow charts which illustrate the user notification and confirmation procedure for the communication device 100 providing out-of-range battery saving in accordance with the present invention. Turning first to FIG. 3, when the user switches the receiver on, at step 302, the signal quality detector 154 checks the channel to determine whether the communication device 100 is in-range or out-of-range of a transmitter 902, at step 304. When the communication device 100 is in-range of a transmitter 902 as indicated by a suitable received signal strength indication (RSSI) or bit error rate (BER), at step 304, normal operation of the communication device 100 occurs, at step 306. Once an out-of-range condition is detected by the signal quality detector 154, the out-of-range detection signal 113 is generated which results in the CPU 112 starting an OOR timer 138 and an ASO timer 140 by executing the OOR timer 138 and ASO timer 140 routines. It will be appreciated that the OOR timer and the ASO timer can be performed by conventional hardware timers, as well. The duration of the OOR timer 138 is established by the OOR timer value 150 stored in the EEPROM 144. In the preferred embodiment of the present invention, the OOR timer value 150 is programmable, and can be set to a predetermined value, such as 4, 6, or 8 minutes, which is sufficient time to ensure the communication device 100 has in fact moved out-of-range of the transmitter 902, rather than into a signal null. The duration of the ASO timer 140 is established by the ASO timer value 152 stored in the EEPROM 144. In the preferred embodiment of the present invention, the ASO timer value 152 is also programmable, and can be set to a predetermined value, such as between 1 hour and 24 hours, preferably in one hour increments. The ASO timer value 152 is sufficiently long to ensure the communication device 100 has truly moved out-of-range of the transmitter 902 rather than being temporarily out-of-range of the transmitter 902 while the communication device is carried into a building or other structure which would temporarily block the transmitter signal, thereby guaranteeing that the receiver does not prematurely revert to the out-of-range battery saving operation, as will be described further below.

When the OOR timer 138 times out, at step 310, the OOR icon 210 can be activated on the display 128 as shown in view 200 of FIG. 2, at step 312 to provide a visual indication that the communication device 100 is out of range of the transmitter. Since the operation of the communication device 100 is not affected when the OOR timer 138 has timed out, displaying the OOR icon 210 can be handled as an option to display or not to display which can also be provided by information programmed into the EEPROM 144. The ASO timer 140 continues to run following the time-out of the OOR timer 138. During the time the ASO timer 140 is continuing to run, the signal quality detector 154 regularly monitors the communication channel, to determine whether the communication device 100 has come in-range of the transmitter 902, at step 402, which will be described in further detail below. When the ASO timer 140 times out, at step 314, the controller 108 interrupts any active functions, such as timekeeping functions, at step 316. A display timer 134 is started, at step 320, and the first visual warning "PAGER OUT-OF-RANGE" is displayed as shown in view 212, and the user is audibly alerted that the communication device 100 is out-of-range of a transmitter 902. The display of the first visual warning and audible alert are maintained for a first predetermined period of time, such as twelve seconds. Once the audible alert times out or is manually reset by the user of the communication device, at step 322, the display timer 134 is again started and the second visual warning "PAGER OUT-OF-RANGE" continues to be displayed as shown in view 218, at step 324. The display of the first visual warning is maintained for a second predetermined period of time, such as two seconds, after which the display timer times out or can be reset by the user of the communication device, at step 326. Power to the receiver 104 is then switched off by the power control circuit 156, at step 328. At step 330, the display timer 134 is again started and the second visual warning "PAGER AUTO SHUTOFF" is displayed, as shown in view 220, alerting the user that the receiver 104 has been turned off. The display of the second visual warning is maintained for a third predetermined period of time, such as five seconds, after which the display timer 134 times out or is reset by the user of the communication device, at step 332. The out-of-range reminder mode is then activated, at step 334, after which the display of the timekeeping function is restored, as shown in view 224. Any timekeeping functions which were interrupted, at step 318, are completed, at step 338. When the supply of power to the receiver 104 is switched off by the power control circuit 156, the conventional battery saving functions are further suspended by the controller 108 until the user again switches on the receiver, at step 302. Depending upon the length of time the communication device 100 is out-of-range of the transmitter 902, and conventional battery saving function is suspended, a significant amount of energy can be saved as compared to a communication device that did not suspend the conventional battery saving function Turning to FIG. 4, when the ASO timer 140 times out, at step 314, program execution continues, at step 316, as described above. The controller 108 continues to monitor the in-range detection signal 115, and as long as the in-range detection signal 115 does not indicate the communication device 100 has come within range of the transmitter 902, at step 404, the ASO timer 140 continues to operate. When the in-range detection signal 115 indicates that the communication device 100 has again come in-range of the transmitter 902, at step 404, and the OOR timer 138 has not yet timed out, at step 406, the OOR timer 138 is reset, at step 408, and the ASO timer is reset, at step 410, after which normal operation of the communication device ensues, at step 306. Because the OOR timer 138 had not timed out at this time, the OOR icon 210 has not yet been displayed, therefor the requirement to turn off the OOR icon 210 does not exist. When the in-range detection signal 115 indicates that the communication device 100 has again come in-range of the transmitter 902, at step 404, and the OOR timer 138 has timed out, at step 406, the ASO timer 140 is reset, at step 412, and the OOR icon 210 is turned off, at step 414, after which normal operation of the communication device ensues, at step 306.

Figure 5:
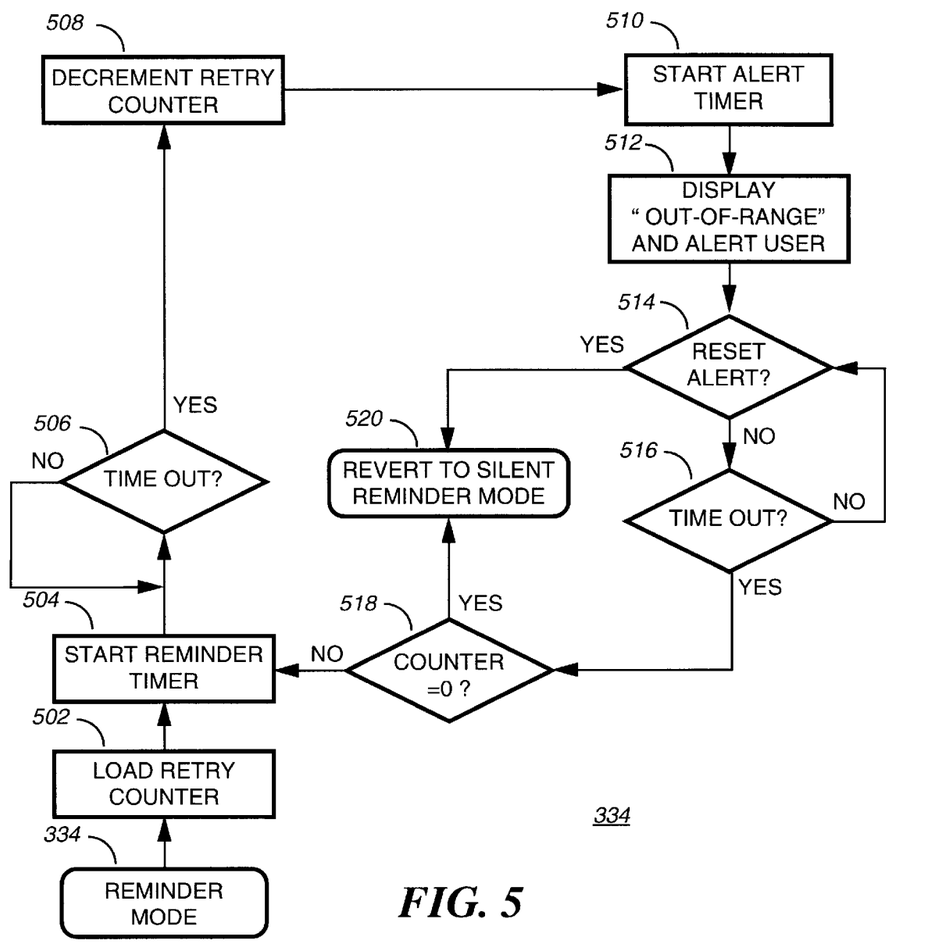

Turning to FIG. 5, when the reminder mode is activated, at step 334, a retry counter 158 is loaded with the retry counter value 146, at step 502. The reminder timer 142 is also loaded with the reminder timer value 148 and started, at step 504. When the reminder timer 142 times out, at step 506, the retry counter 158 is decremented by one, at step 508. The alert timer 136 is started, at step 510, during which time the visual warning "OUT-OF-RANGE" 216 is displayed, and the user of the communication device 100 is alerted, at step 512. When the alert is not reset by the user, at step 514, and the alert timer 136 times out, at step 516, the value of the retry counter 158 is compared to zero, and when not equal to zero, at step 518, step 504 through step 518 are repeated. When the alert has been reset by the user, at step 514, prior to the alert timer 136 timing out, at step 516; or when the alert has not been reset by the user, at step 514, and the alert timer 136 has timed out, at step 516, the value of the retry counter 158 is again compared to zero, and when equal to zero, at step 518, the controller 108 reverts to a silent reminder mode, at step 520.

Figure 6:
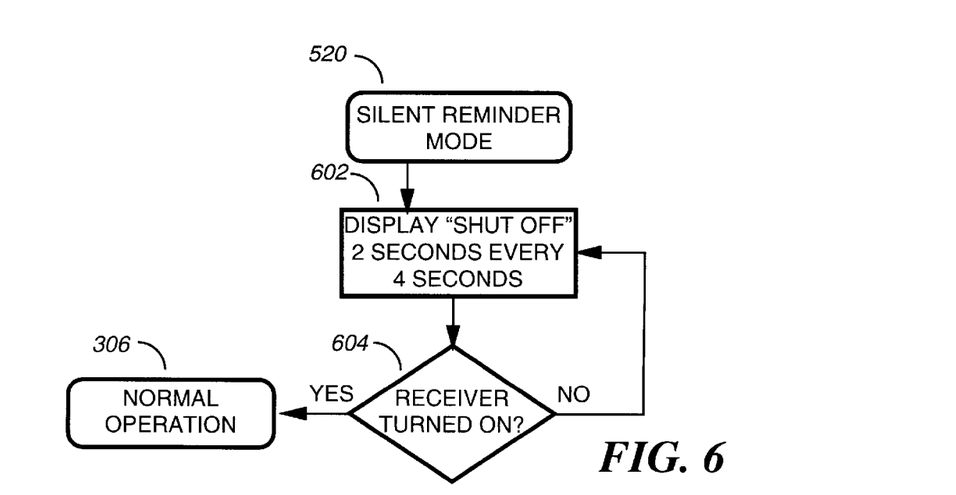

Turning to FIG. 6, when the silent reminder mode, at step 520 is entered, the visual warning "SHUT OFF" is displayed on the display 128 for two seconds out of every four seconds, alternating with the display of the time information. The silent reminder mode at step 520 continues until the receiver is turned on by the user, at step 604, at which time normal operation of the communication device 100 is restored, at step 306.

Figure 7:
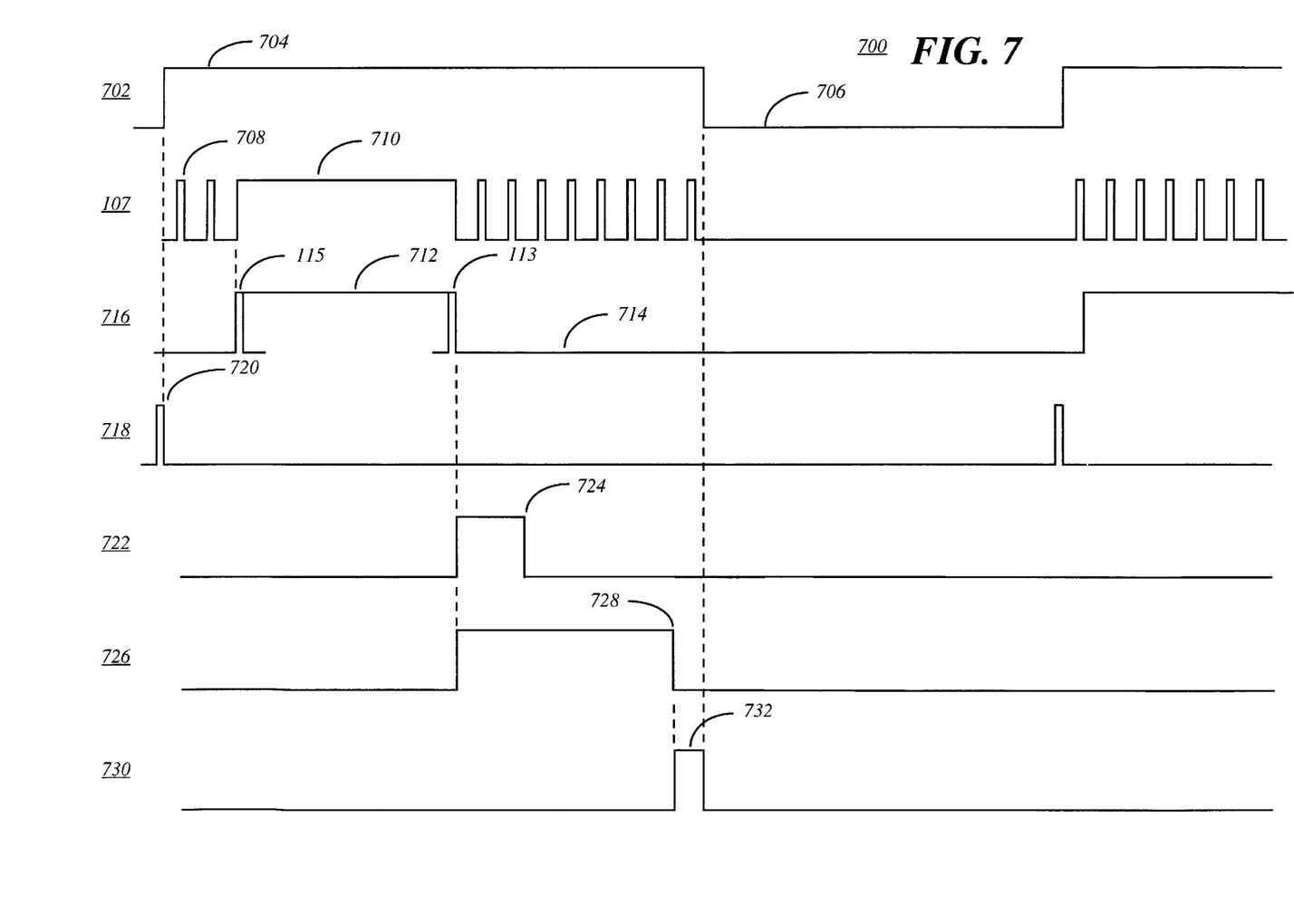
FIGS. 7 and 8 are timing diagrams which illustrate operation of the communication device providing out-of-range battery saving in accordance with the present invention.
Figure 8:
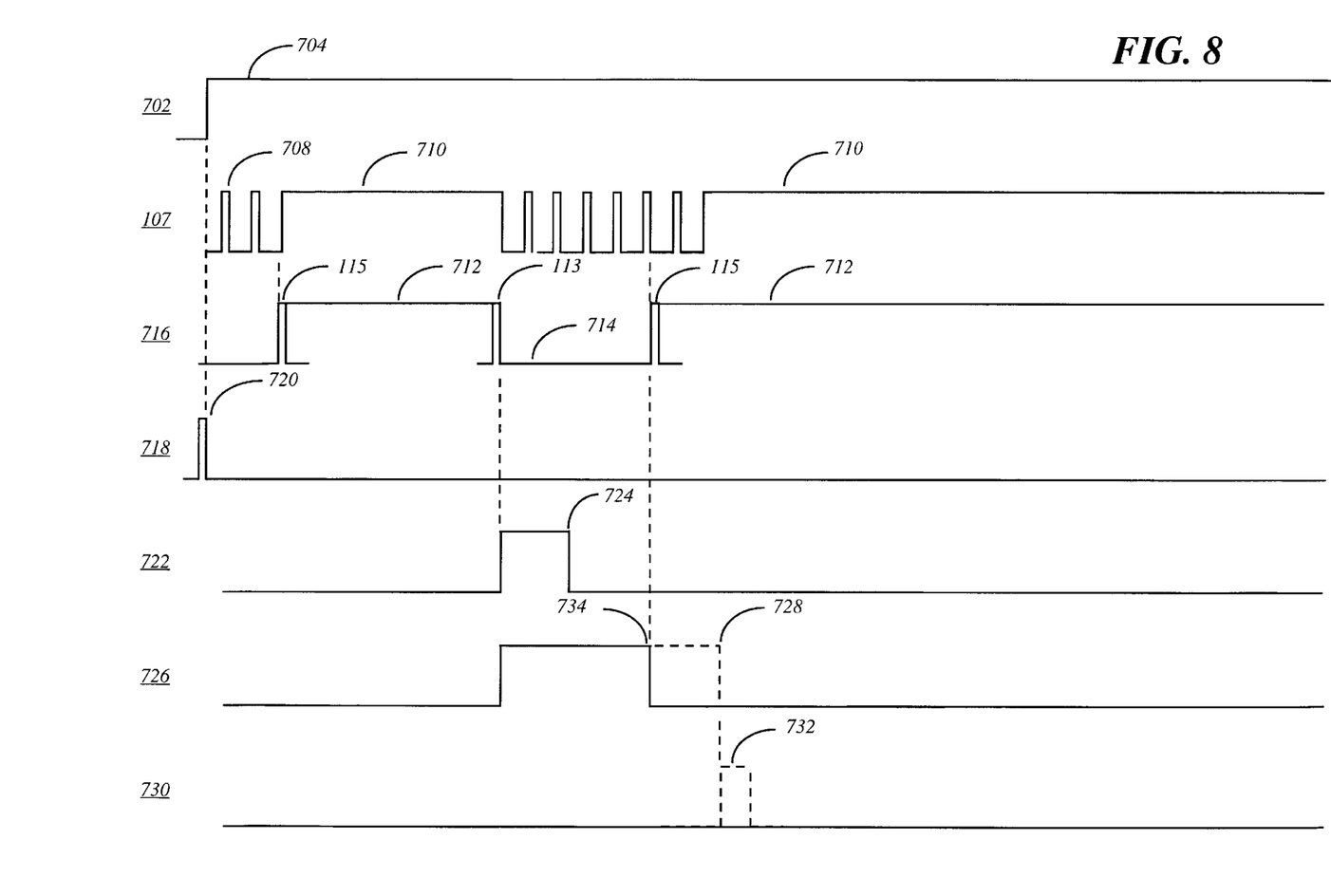

FIGS. 7 and 8 are timing diagrams which illustrate operation of the communication device 100 providing an out-of-range battery saving function 700 in accordance with the present invention. Turning first to FIG. 7, a number of wave forms are shown illustrating the operation of the communication device 100 providing out-of-range battery saving in accordance with the present invention. Waveform 702 depicts receiver activity, in particular time interval 704 during which normal receiver operation is enabled, and time interval 706 during which normal receiver operation is disabled, i. e. out-of-range battery saving in accordance with the present invention is enabled. Waveform 107 depicts receiver power control, and in particular illustrates battery saving strobe time intervals 708 during which power is supplied to the receiver 104 during conventional receiver battery saving operation, and a time interval 712 during which power to the receiver 104 is continuously supplied to receive messages being transmitted on the channel. Waveform 716 depicts the operation of the signal quality detector 154, and in particular illustrates a time interval 712 during which acceptable signal quality is detected (in-range of the transmitter 902), and a time interval 714 during which an unacceptable signal quality is detected (out-of-range of the transmitter 902 or blocked from signal reception). Also shown is the intervals during which an in-range detection signal 115 and the out-of-range detection signal 113 are generated. Waveform 718 illustrates activity by the user to switch the receiver from an off mode, or out-of-range battery saving mode, to the on mode. When the user switches on the receiver 104 by actuating the user controls 130 at time interval 720, the receiver is switched to the receiver on mode for time interval 704. Conventional battery saving operation ensues as described above until a signal detected during time interval 712 indicates the presence of an acceptable transmission, at which time the signal quality detector generates the in-range detection signal 115. Normal operation of the communication device occurs during time interval 712, at which point the signal quality detector 154 detects the absence of an acceptable transmission, at which time the out-of-range detection signal 113 is generated. Waveform 722 depicts operation of the OOR timer 138. OOR timer 138 operation is initiated by the out-of-range detection signal 113, and produces an out-of-range notification signal 724 when the OOR timer 138 times out. Waveform 726 depicts the operation of the ASO timer 140. ASO timer 140 operation is also initiated by the out-of-range detection signal 113, and produces an out-of-range confirmation signal 728 when the ASO timer 140 times out. Waveform 730 depicts a time interval 732 during which time the user of the communication device 100 is both alerted and visually informed on the display 128 that the receiver will be placed in the out-of-range battery saving mode in accordance with the present invention. As described above, time interval 732 comprises a sequence of times intervals during which different visual warnings are displayed on the display 128.

FIG. 8 illustrates the operation of the out-of-range battery saving function 700 in accordance with the present invention when the sequence of events is such as to not place the receiver 104 in the out-of-range battery saving mode. As shown in FIG. 8, an out-of-range condition is initially detected, an out-of-range detection signal 113 is generated, and both the OOR timer 138 and the ASO timer 140 are started. In the instance depicted, the receiver remains out-of-range of the transmitter 902 for a period of time sufficient for the OOR timer 138 to time out, however not long enough for the ASO timer 140 to have timed out normally and generate the out-of-range confirmation signal 728. Consequently, the in-range detection signal 115 causes the ASO timer 140 to be reset early at time interval 734. No out-of-range warnings are consequently generated during time interval 732, and normal operation of the communication device 100 is restored.

Figure 9:
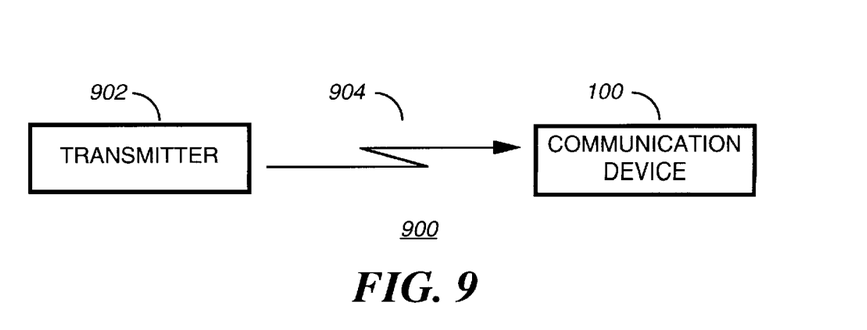
FIG. 9 is an block diagram of a communication system in accordance with the present invention.

FIG. 9 is an block diagram of a communication system 900 in accordance with the present invention. The communication system 900 typically includes multiple transmitters which are located to provide wide area coverage in a manner well known to one of ordinary skill in the art, and which utilizes simulcast transmissions from the transmitters for the delivery of messages over a radio frequency (RF) channel 904. At any given period of time, the communication device 100 receives message transmissions over the radio frequency channel 904 from at least one transmitter 902, although it will be appreciated that the communication device 100 can be located so as to receive message transmissions from several transmitters. Operation of the communication device 100 within the communication system 900 was described above.

In summary, a method for providing an out-of-range battery saving function 700 for a communication device 100 having a receiver 104 which receives messages transmitted from at least one transmitter 902 over a radio frequency channel 904 has been described above. The out-of range battery saving function is provided using a two step approach, providing first an out-of-range notification signal 724 to the controller 108 that the communication device 100 is out-of-range of the transmitter 902 for at least a first period of time 722, selectable between 4, 6 or 8 minutes; and then providing second an out-of-range confirmation signal 728 confirming that the communication device 100 is out-of-range of the transmitter 902 for at least a second period of time 726, selectable between 1 hour and 24 hours in one hour increments. The out-of-range condition is detected by a loss of signal on the radio frequency channel. Information, such as an OOR icon 210, is displayed on a display 128 in response to the out-of-range notification signal 724 being generated. A regular supply of power to the receiver 104 is maintained to enable detection of signals transmitted on the radio frequency channel while the communication device is operating using conventional battery saving techniques. A first visual warning 216 is provided, and the user is alerted, in response to the out-of-range confirmation signal 728 being generated. A first timer 138 is used to generate the first period of time 722, while a second timer 140 is used to generate the second period of time 728. Detection of an in-range conditions before either or both timers times out causes the timers to be reset. A second visual warning 222 is provided subsequent to the display of the first visual warning 216 prior to power to the receiver 104 being switched off. Normal operation of the communication device 100 is restored by manually turning on the receiver 104.

While specific embodiments of this invention have been shown and described, further modifications and improvements will occur to those skilled in the art. All modifications which retain the basic underlying principles disclosed and claimed herein are with the scope and spirit of the present invention.

We claim:

1. A communication device providing an out-of-range battery saving function for a receiver which receives messages transmitted from at least one transmitter over a radio frequency channel, said communication device comprising:

a signal quality detector for detecting when the communication device is out-of-range of the at least one transmitter by detecting a loss of signal on the radio frequency channel, and in response thereto for generating an out-of-range detection signal;

a controller, responsive to the out-of-range detection signal, for determining when the communication device is out-of-range of a transmitter for a first predetermined period of time, and in response thereto generating an out-of-range notification signal;

an alert generator;

a display for displaying a first visual warning in response to the out-of-range notification signal being generated; and a power control circuit, responsive to said controller, for maintaining a supply of power to the receiver of the communication device to enable detection of messages transmitted on the radio frequency channel, said controller being further responsive to the out-of-range detection signal, for determining when the communication device is out-of-range of the at least one transmitter for a second predetermined period of time greater than the first predetermined period of time, and in response thereto generating an out-of-range confirmation signal, wherein said alert generator is responsive to the out-of-range confirmation signal, for generating a sensible alert, said display further displays a first visual warning in response to the out-of-range confirmation signal being generated, and said power control circuit further suspends the supply of power to the receiver of the communication device subsequent to the sensible alert being terminated.

2. The communication device of claim 1, further comprising:

a memory for storing a first timer value; and a first timer, enabled by said controller, for generating a first out-of-range timer interval when loaded by said controller with the first timer value, wherein said controller is responsive to said first timer for generating the out-of-range notification signal when the first out-of-range timer interval has elapsed.

3. The communication device of claim 2, wherein said memory further stores a second timer value which represents a second out-of-range timer interval greater than the first out-of-range timer interval, and wherein the communication device further comprises a second timer, enabled by said controller, for generating the second out-of-range timer interval when loaded by said controller with the second timer value, and said controller, further generates the out-of-range confirmation signal when the second out-of-range timer interval has elapsed.

4. The communication device of claim 1, wherein said display further displays a visual indication that the communication device is out-of-range of the transmitter in response to the out-of-range notification signal being generated.

5. The communication device of claim 1, wherein said signal quality detector generates an in-range detection signal when the communication device is within range of the transmitter.

6. The communication device of claim 1, wherein said controller further controls a non-receiver related function, and wherein said controller monitors when the non-receiver related function is active, and suspends the non-receiver related function when the out-of-range confirmation signal is generated, and further re-enables the non-receiver related function when power to the receiver has been switched off.

7. A communication device providing an out-of-range battery saving function for a receiver which receives messages transmitted from at least one transmitter over a radio frequency channel, said communication device comprising a signal quality detector for detecting when the communication device is out-of-range of the at least one transmitter by detecting a loss of signal on the radio frequency channel, and in response thereto for generating an out-of-range detection signal;

a controller, responsive to the out-of-range detection signal, for determining when the communication device is out-of-range of a transmitter for a first predetermined period of time, and in response thereto generating an out-of-range confirmation signal;

an alert generator, responsive to the out-of-range confirmation signal, for generating a sensible alert;

a display for displaying a first visual warning in response to the out-of-range confirmation signal being generated;

a power control circuit for suspending a regular supply of power to the receiver of the communication device subsequent to the sensible alert being terminated;

a reminder timer, enabled by said controller when power to the receiver is suspended, for generating a reminder timer interval, wherein said display is responsive to said controller for displaying an out-of-range reminder message when the reminder timer interval has elapsed; and a retry counter for counting with a value representing the number of times the out-of-range reminder message is displayed, wherein said controller decrements said retry counter value each time the out-of-range reminder message is displayed;

a retry counter for counting with a value representing the number of times the out-of-range reminder message is displayed, and wherein said controller decrements said retry counter value each time the out-of-range reminder message is displayed.

8. The communication device of claim 1 further comprising user control for manually restoring power to the receiver when the communication device has been switched off.

9. A method for providing an out-of-range battery saving function in a communication device having a receiver which receives messages transmitted from at least one transmitter over a radio frequency channel, said method comprising the steps of:

detecting when the communication device is out-of-range of the at least one transmitter by detecting a loss of signal on the radio frequency channel, and in response thereto, generating an out-of-range detection signal;

in response to the out-of-range detection signal being generated, determining when the communication device is out-of-range of the at least one transmitter for a first predetermined period of time, and in response thereto generating an out-of-range notification signal;

generating a sensible alert in response to the out-of-range notification signal being generated;

displaying a first visual warning in response to the out-of-range notification signal being generated;

maintaining a regular supply of power to the receiver of the communication device to enable detection of signal on the radio frequency channel; and further in response to the out-of-range detection signal being generated, determining when the communication device is out-of-range of the at least one transmitter for a second predetermined period of time less than the first predetermined period of time, and in response thereto generating an out-of-range notification signal;

displaying information on a display in response to the out-of-range notification signal being generated; and suspending the regular supply of power to the receiver of the communication device subsequent to the sensible alert being terminated.

10. The method of claim 9 wherein said step of determining comprises:

loading a first timer with a first timer value representing a first out-of-range timer interval;

starting the first timer in response to the out-of-range detection signal being generated; and generating the out-of-range notification signal when the first out-of-range timer interval has elapsed.

11. The method of claim 10 wherein said step of further determining comprises:

loading a second timer with a second timer value representing a second out-of-range timer interval less than the first out-of-range timer interval;

starting the second timer in response to the out-of-range detection signal being generated; and generating an out-of-range notification signal when the second out-of-range timer interval has elapsed.

12. The method of claim 11, further comprising the step of displaying on a display a visual indication that the communication device is out-of-range of the at least one transmitter in response to the out-of-range notification signal being generated.

13. The method of claim 9 further comprising the steps of:

detecting when the communication device is within range of the at least one transmitter, and in response thereto, generating an in-range detection signal; and suspending said step of determining when the communication device is out of range of the at least one transmitter.

14. The method of claim 9, wherein said step of suspending a regular supply of power comprises the steps of:

displaying a second visual warning subsequent to displaying the first visual warning; and switching off power to the receiver following the display of the second visual warning.

15. The method of claim 9 further comprising the steps of:

monitoring whether a non-receiver related function is active; and suspending the non-receiver related function when the out-of-range confirmation signal is generated.

16. The method of claim 15 further comprising the step of enabling the non-receiver related function when power to the receiver has been switched off.

17. The method of claim 9 further comprising the steps of:

loading a timer with a reminder timer value representing a reminder timer interval;

starting the timer in response to power to the receiver being switched off; and displaying an out-of-range reminder message when the reminder timer interval has elapsed.

18. The method of claim 17 further comprising the steps of:

loading a counter with a value representing a number of times an out-of-range reminder message is to be displayed; and decrementing the counter value each time the out-of-range reminder message is displayed.

19. The method of claim 9 further comprising the step of manually restoring power to the receiver when the communication device has been switched off.

* * * * *